(12) United States Patent
Hershman (10) Patent No.: US 10,979,054 B1
(45) Date of Patent: Apr. 13, 2021

(54) COUPLING OF COMBINATIONAL LOGIC CIRCUITS FOR PROTECTION AGAINST SIDE-CHANNEL ATTACKS

(71) Applicant: Nuvoton Technology Corporation, Hsin-chu (TW)

(72) Inventor: Ziv Hershman, Givat Shmuel (IL)

(73) Assignee: NUVOTONN TECHNOLOGY CORPORATION, Hsin-Chu (TW)

( * ) Notice: Subject to any disclaimer, the term of this patent is extended or adjusted under 35 U.S.C. 154(b) by 0 days.

(21) Appl. No.: 16/741,779

(22) Filed: Jan. 14, 2020

(51) Int. Cl.
| | |
|---|---|
| G06F 21/75 | (2013.01) |
| H03K 19/20 | (2006.01) |
| H03K 3/027 | (2006.01) |
| G06F 13/12 | (2006.01) |
| H03K 5/135 | (2006.01) |
| H03K 5/00 | (2006.01) |

(52) U.S. Cl.
CPC ........... *H03K 19/20* (2013.01); *G06F 13/122* (2013.01); *G06F 21/75* (2013.01); *H03K 3/027* (2013.01); *H03K 5/135* (2013.01); H03K 2005/00013 (2013.01)

(58) Field of Classification Search
CPC .......... G06F 21/00; G06F 21/70; G06F 21/71; G06F 21/75; G06F 21/755; G06F 21/76; G06F 21/77
See application file for complete search history.

(56) References Cited

U.S. PATENT DOCUMENTS

| | | | |
|---|---|---|---|
| 7,734,894 B1 | 6/2010 | Wentzlaff et al. | |
| 7,893,742 B2 | 2/2011 | Shibayama et al. | |
| 8,804,949 B2 | 8/2014 | Fontana et al. | |
| 8,983,068 B2 | 3/2015 | Gammel et al. | |
| 2001/0017558 A1 | 8/2001 | Hanzawa et al. | |
| 2008/0224727 A1* | 9/2008 | Verbauwhede | G06F 30/394 326/8 |

(Continued)

OTHER PUBLICATIONS

Baddam, K., "Hardware Level Countermeasures Against Differential Power Analysis", Doctor Thesis, University of Southampton, Faculty of Physical and Applied Sciences, School of Electronics and Computer Science, pp. 1-388, Feb. 2012.

(Continued)

*Primary Examiner* — Seokjin Kim (74) *Attorney, Agent, or Firm* — Kliger & Associates Patent Attorneys Ltd (57) ABSTRACT

A secure IC includes multiple functionally-equivalent combinational logic circuits, multiple sets of state-sampling components, and control circuitry. Each combinational logic circuit receives one or more inputs, and applies a combinational-logic operation to the one or more inputs so as to produce one or more outputs. Each set of state-sampling components includes one or more state-sampling components that samples one or more of the outputs of one of the combinational logic circuits and provides one or more of the sampled outputs as inputs to another of the combinational logic circuits. The control circuitry receives multiple sets of input data for processing by the combinational logic circuits, routes the sets of input data to the combinational logic circuits, extracts sets of output data from the combinational logic circuits, and outputs each set of output data in association with the respective set of input data.

18 Claims, 2 Drawing Sheets

(56) References Cited

U.S. PATENT DOCUMENTS

2009/0222672 A1    9/2009  Clarke et al.
2017/0163416 A1    6/2017  Hars
2018/0097618 A1*   4/2018  Kumar .................. H04L 9/0662

OTHER PUBLICATIONS

Verbauwhede ., "Integrated Circuits and Systems", Springer Science+Business Media, LLC, pp. 1-250, year 2010.
Bellizia et al., "Secure Double Rate Registers as an RTL Countermeasure Against Power Analysis Attacks", IEEE Transactions on Very Large Scale Integration (VLSI) Systems, pp. 1-9, year 2018.
Mangard et al., "Power Analysis Attacks: Revealing the Secrets of Smart Cards", Springer Science+Business Media, LLC, p. 233, year 2010.
Hershman et al., U.S. Appl. No. 16/194,342, filed Nov. 18, 2018.

* cited by examiner

COUPLING OF COMBINATIONAL LOGIC CIRCUITS FOR PROTECTION AGAINST SIDE-CHANNEL ATTACKS

FIELD OF THE INVENTION

The present invention relates generally to data security in electronic circuitry, and particularly to methods and systems for protecting against side-channel attacks.

BACKGROUND OF THE INVENTION

Various techniques, referred to as side-channel attacks, have been developed for extracting information from electronic devices. Side-channel attacks are typically performed by unauthorized parties in order to access secret information stored within the devices. Some side-channel attacks take advantage of the fact that electronic devices typically consume power during transitions of logic elements. The attacks extract information by non-invasively measuring electrical signals and/or electromagnetic radiation emitted from the devices, without electrically contacting the devices that carry the information.

Various countermeasures have been proposed for protecting electronic devices against side-channel attacks. For example, Baddam describes several types of countermeasures, and in particular Dual Rail Precharge (DRP) circuits, in a PhD Thesis entitled "Hardware Level Countermeasures Against Differential Power Analysis," University of Southampton, Faculty of Physical and Applied Sciences, School of Electronics and Computer Science, February, 2012.

SUMMARY OF THE INVENTION

An embodiment of the present invention that is described herein provides a secure IC including multiple functionally-equivalent combinational logic circuits, multiple sets of state-sampling components, and control circuitry. Each combinational logic circuit is configured to receive one or more inputs, and to apply a combinational-logic operation to the one or more inputs so as to produce one or more outputs. Each set of state-sampling components includes one or more state-sampling components configured to sample one or more of the outputs of one of the functionally-equivalent combinational logic circuits and to provide one or more of the sampled outputs as inputs to another of the functionally-equivalent combinational logic circuits. The control circuitry is configured to receive multiple sets of input data for processing by the functionally-equivalent combinational logic circuits, to route the sets of input data to the functionally-equivalent combinational logic circuits, to extract sets of output data from the functionally-equivalent combinational logic circuits, and to output each set of output data in association with the respective set of input data.

In some embodiments, the combinational-logic operation includes an iteration of an iterative secure computation. In some embodiments, by providing the sampled outputs of one of the combinational logic circuits as inputs to another of the combinational logic circuits, a sequence of iterations of the combinational-logic operation, applied to a given set of input data, is performed by multiple different ones of the combinational logic circuits. In some embodiments, by providing the sampled outputs of one of the combinational logic circuits as inputs to another of the combinational logic circuits, a given one of the combinational logic circuits applies the combinational-logic operation to multiple different sets of input data in successive clock cycles.

In an embodiment, at least two of the functionally-equivalent combinational logic circuits differ in hardware implementation from one another. In an example embodiment, at least one of the functionally-equivalent combinational logic circuits is implemented using negative logic relative to another of the functionally-equivalent combinational logic circuits.

In another embodiment, the control circuitry is configured to receive the sets of input data over respective I/O interfaces, and to output each set of output data on a same I/O interface via which the corresponding set of input data was received. In yet another embodiment, the control circuitry is configured to distribute the sets of input data to the functionally-equivalent combinational logic circuits in cyclic alternation, and to collect the sets of output data from the functionally-equivalent combinational logic circuits in cyclic alternation.

In a disclosed embodiment, the control circuitry is configured to initialize at least some of the input data to be random or pseudorandom data. In an embodiment, one or more of the combinational logic circuits are configured to perform at least one of: (i) continue applying the combinational-logic operation after the output data has been extracted, and (ii) begin applying the combinational-logic operation before the input data has been provided.

Additionally or alternatively, the control circuitry is configured to cause relative delays between times at which the input data is provided to at least two of the combinational logic circuits.

There is additionally provided, in accordance with an embodiment of the present invention, a method for data processing in a secure Integrated Circuit (IC). The method includes operating multiple functionally-equivalent combinational logic circuits, including, in each combinational logic circuit, receiving one or more inputs and applying a combinational-logic operation to the one or more inputs so as to produce one or more outputs. Multiple sets of state-sampling components are operated, including, in each set, sampling one or more of the outputs of one of the functionally-equivalent combinational logic circuits by one or more state-sampling components and providing one or more of the sampled outputs as inputs to another of the functionally-equivalent combinational logic circuits. Using control circuitry, multiple sets of input data are received for processing by the functionally-equivalent combinational logic circuits, the sets of input data are routed to the functionally-equivalent combinational logic circuits, sets of output data are extracted from the functionally-equivalent combinational logic circuits, and each set of output data is output in association with the respective set of input data.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and circuitry for protecting electronic devices against side-channel attacks. The disclosed techniques can be used in various types of secure devices, such as secure embedded controllers and memory devices.

In some disclosed embodiments, a secure Integrated Circuit (IC) comprises multiple combinational logic circuits that are configured to operate concurrently. Each combinational logic circuit is configured to receive one or more inputs, and to apply a combinational-logic operation to the inputs so as to produce one or more outputs. The combinational-logic operation typically comprises an iteration of some iterative secure computation, e.g., a mathematical calculation, encryption, decryption or authentication computation.

In the disclosed embodiments, the multiple combinational logic circuits are functionally-equivalent to one another, i.e., produce the same outputs when given the same inputs, but may differ in internal implementation and/or behavior. Some differences may be introduced deliberately by the designer. Other differences may be introduced, for example, by design or synthesis tools, or by process variations in the manufacturing process.

The IC further comprises multiple sets of Flip-Flops (FFs), each set configured to sample the outputs of a respective combinational logic circuit and to provide the sampled outputs as inputs for the next clock cycle. A combinational logic circuit, the interface signals and the corresponding set of FFs are sometimes referred to jointly as a "processing engine."

Instead of conventionally feeding the sampled outputs back to the inputs of the same combinational logic circuit, however, in the disclosed embodiments at least some of the FFs are configured to provide the sampled outputs as inputs to another combinational logic circuit. Since the combinational logic circuits are functionally-equivalent, and since they apply a combinational-logic operation that is memoryless (stateless) and depends only on the inputs, this configuration produces the correct output signals, albeit by a different combinational logic circuit.

In an example embodiment, multiple combinational logic circuits are coupled to one another cyclically in the manner described above (i.e., the outputs of each combinational logic circuit are sampled and provided as inputs to the next combinational logic circuit; the outputs of the last combinational logic circuit are sampled and provided as inputs to the first combinational logic circuit). Thus, when performing a sequence of iterations of an iterative secure computation, successive iterations are performed alternately by the various combinational logic circuits. When performing multiple such sequences (multiple iterative secure computations) in parallel, a given combinational logic circuit alternates between combinational-logic operations of different secure computations from one clock cycle to the next. This alternation makes it difficult for a side-channel attacker to identify characteristics of the secure computations being performed.

The internal differences between functionally-equivalent combinational logic circuits further diversify the IC's power consumption and emitted radiation profiles, and therefore further enhance resilience to side-channel attacks. The disclosed configurations are also useful against fault-injection attacks, since the iterations of a secure computation are distributed over multiple combinational logic circuits. Another feature useful against fault injection, as will be described below, is that in some embodiments one or more of the combinational logic circuits may run a known-answer test.

When using the disclosed configuration, it is typically necessary to extract the end result of the secure computation from the correct combinational logic circuit (i.e., extract the outputs of the combinational logic circuit that performed the last iteration), and associate the end result with the corresponding input data. Consider, for example, an embodiment in which multiple sets of input data (e.g., multiple plaintext words for encryption) are received over multiple respective I/O interfaces. In this embodiment it is typically required to extract each set of output data (e.g., each encrypted data word) from the outputs of the correct combinational logic circuit, and output each set of output data on the I/O interface via which the corresponding set of input data was received.

Thus, in some embodiments the IC further comprises control circuitry, which is configured to receive multiple sets of input data for processing by the functionally-equivalent combinational logic circuits, to route the sets of input data to the functionally-equivalent combinational logic circuits, to extract sets of output data from the functionally-equivalent combinational logic circuits, and to output each set of output data in association with the respective set of input data.

In some embodiments, the coupling between functionally-equivalent combinational logic circuits can be implemented during the IC design using an automated process, e.g., using scripts.

The methods and systems described herein provide enhanced resilience against side-channel attacks in ICs that comprise multiple combinational logic circuits. At the same time, in some embodiments, the disclosed techniques do not incur a penalty in clock speed or throughput. Various implementation examples of these techniques are described herein. Embodiments that further increase resilience against side-channel attacks, such as implementing one or more of the combinational logic circuits using negative logic, are also described.

System Description

Figure 1:
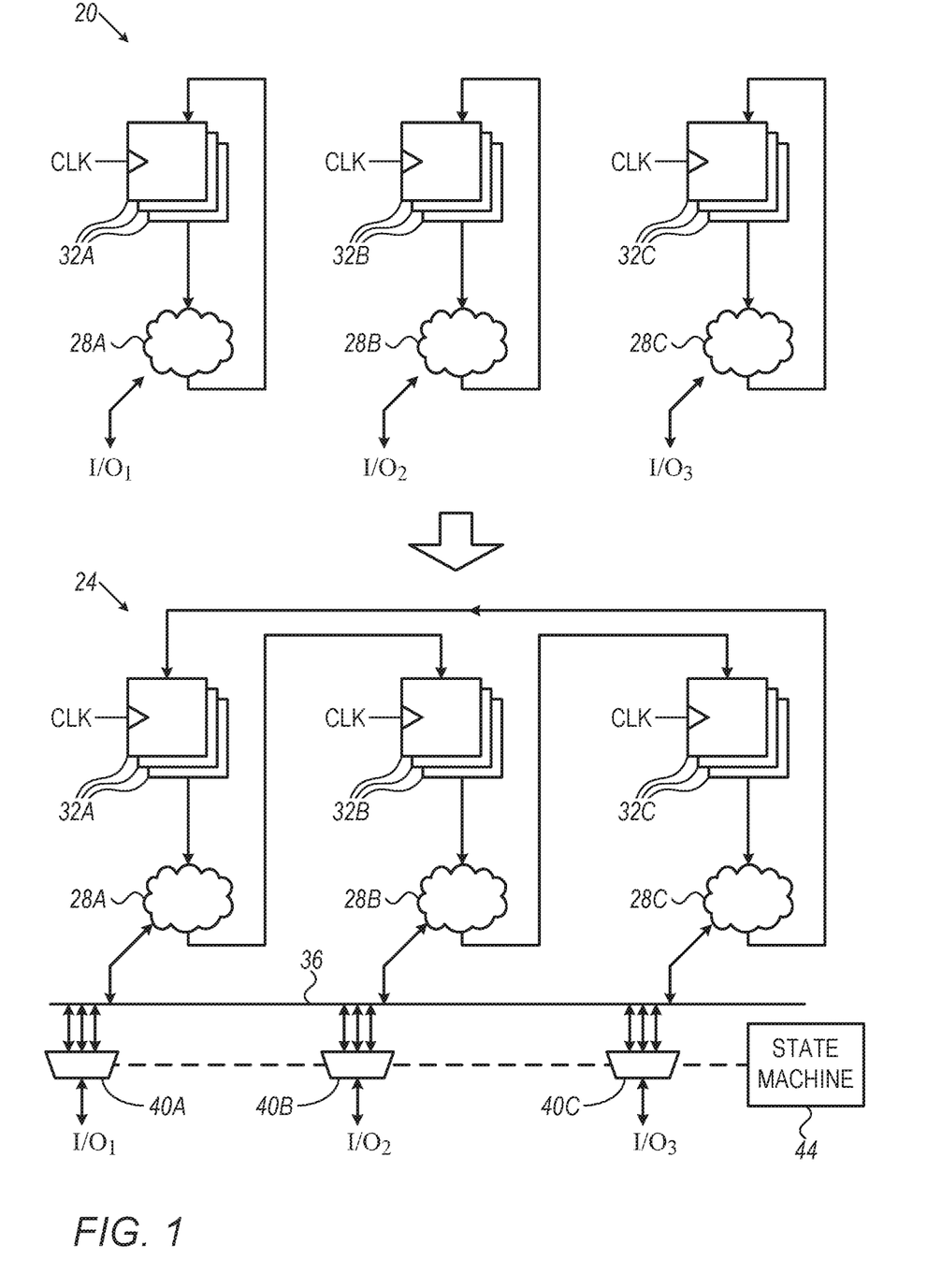
FIG. 1 is a block diagram that schematically illustrates a secure electronic device comprising coupled, functionally-equivalent combinational logic circuits, in accordance with an embodiment of the present invention.

FIG. 1 is a block diagram that schematically illustrates a secure electronic device 24 protected against side-channel attacks, in accordance with an embodiment of the present invention. Device 24 may be part of, for example, an Integrated Circuit (IC) such as a memory device with integrated encryption circuitry, or an Embedded Controller (EC) or Baseboard Management Controller (BMC) that comprises encryption or authentication circuitry, or any other suitable secure electronic device.

Secure device 24 is depicted at the bottom of the figure. The top of the figure shows a hypothetical conventional device 20, for comparison and ease of explanation. The description that follows will first explain the operation of conventional device 20, and then proceed to the embodiment of device 24.

Hypothetical device 20 comprises multiple combinational logic circuits 28. Each combinational logic circuit is configured to receive one or more inputs, and to apply a combinational-logic operation to the inputs, so as to produce one or more outputs. Each combinational logic circuit 28 is coupled to a set of one or more state-sampling components, in the present example Flip-Flops (FFs) 32, which sample the outputs of the combinational logic circuit in each clock cycle, and provide the sampled outputs to serve as inputs of the combinational logic circuit in the next clock cycle. As noted above, a combinational logic circuit, the interface signals and the corresponding set of FFs are sometimes referred to jointly as a "processing engine."

In the present example, device 20 comprises three combinational logic circuits denoted 28A, 28B and 28C, coupled to respective sets of FFs denoted 32A, 32B and 32C. The inputs and outputs of combinational logic circuit 28A are denoted $I/O_1$, the inputs and outputs of combinational logic circuit 28B are denoted $I/O_2$, and the inputs and outputs of combinational logic circuit 28C are denoted $I/O_3$.

Each of combinational logic circuits 28A-28C is configured to perform a certain combinational-logic operation, typically a secure computation or a building-block thereof. Examples of combinational-logic operations comprise a multiplication, an iteration of an encryption, decryption, signing or authentication process, or any other suitable type of combinational-logic operation. Secure processing operations, such as Secure Hash Algorithm (SHA), Data Encryption Standard (DES) or Advanced Encryption Standard (AES) operations, typically comprise sequences of such combinational-logic operations performed in multiple successive clock cycles.

Consider, for example, a scenario in which each combinational logic circuit (each of circuits 28A-28C) is configured to execute an iteration of some iterative encryption algorithm. In a typical flow of operations, circuit 28A receives on $I/O_1$ an input data word IN1 to be encrypted, circuit 28B receives on $I/O_2$ another input data word IN2 to be encrypted, and circuit 28C receives on $I/O_3$ yet another input data word IN3 to be encrypted. Circuit 28A performs a sequence of iterations starting with the input data word. In each iteration circuit 28A applies the combinational-logic operation to its inputs (which may arrive from $I/O_1$ or from the previous state of FFs 32A). FFs 32A sample the outputs and provide them as inputs for the next iteration. Following the sequence of operations, an encrypted data word OUT1 is output on $I/O_1$. In parallel, circuit 28B performs a sequence of iterations starting with the input data word IN2 provided on $I/O_2$, and outputs an encrypted data word OUT2 on $I/O_2$. Circuit 28C similarly encrypts the data word IN3 it received on $I/O_3$, so as to output an encrypted data word OUT3 on $I/O_3$.

In conventional device 20, as seen in the figure, combinational logic circuits 28A-28C operate independently of one another. Each combinational logic circuit 28 receives its own inputs, applies the combinational-logic operation to the inputs, samples the outputs using the respective FFs 32, and feeds the sampled outputs back to its own inputs for the next clock cycle. This conventional architecture is sensitive to side-channel attacks, because the independent operation of each combinational logic circuit enables an attacker to identify characteristic patterns in power consumption and/or emitted radiation.

In some embodiments, the sensitivity to side-channel attacks is reduced by introducing deliberate coupling between the different processing circuits (combinational logic circuits). Device 24, at the bottom of the figure, demonstrates the coupled architecture, in accordance with an embodiment of the present invention.

An assumption behind the architecture of device 24 of FIG. 1 is that combinational logic circuits 28A-28C are functionally-equivalent to one another. In the present context, the term "functionally-equivalent" means that, given the same set of inputs, any of the combinational logic circuits will produce the same set of outputs. Differences in internal hardware implementation and/or behavior are, however, permitted between different combinational logic circuits.

Several non-limiting examples of differences in internal implementation, which still maintain functional equivalence, include the following:

- Look-Up Tables (LUTs) in different combinational logic circuits can be made with different preconfigured masks for their inputs and outputs, and the input and output of the look-up table can be XORed with the corresponding masks to comply with the intended combinational-logic operation.
- For A=B+C, the combinational-logic operations (X*A) and (X*B+X*C) are functionally-equivalent but differ in implementation and in power consumption.
- Any combinational-logic operation can be implemented as a sum-of-product or as a product-of-sum. The implementations are different, but functionally-equivalent.
- Even combinational-logic operations having the same RTL logic implementation can be made different due to different physical constraints or different synthesis directives.

Consider, again, an example scenario in which input data word IN1 is provided for encryption on $I/O_1$, input data word IN2 is provided for encryption on $I/O_2$, and input data word IN3 is provided for encryption on $I/O_3$. In the configuration of device 24, circuit 28A performs the first iteration on input data word IN1, but the resulting outputs are sampled by FFs 32B. As such, the next iteration in this sequence (the next clock cycle—the second iteration of encrypting input data word IN1) is performed by circuit 28B. The resulting outputs (of circuit 28B) are sampled by FFs 32C, and the next iteration (the third iteration of encrypting input data word IN1) is performed by circuit 28C. The sequence proceeds in a cyclic manner—The outputs of circuit 28C are sampled by FFs 32A and provided as input to circuit 28A.

Thus, the sequence of combinational-logic operations needed for encrypting IN1 is performed cyclically by circuits 28A, 28B, 28C, 28A, 28B, 28C, 28A, and so on. Since circuits 28A-28C are functionally-equivalent to one another, the end result (the encrypted data word OUT1) is correct. The encrypted data word is provided on the outputs of one of the circuits (depending on the number of iterations performed).

Similarly, the sequence of combinational-logic operations needed for encrypting IN2 begins in circuit 28B, and proceeds cyclically in circuits 28C, 28A, 28B, 28C, 28A, 28B, and so on. The sequence of combinational-logic operations needed for encrypting IN3 begins in circuit 28C, and proceeds cyclically in circuits 28A, 28B, 28C, 28A, 28B, 28C, and so on.

As can be seen from the description above, from one clock cycle to the next, a given combinational logic circuit alternates between combinational-logic operations belonging to different sequences. Circuit 28A, for example, performs the following operations in successive clock cycles:

First encryption iteration of data word IN1.
Second encryption iteration of data word IN3.
Third encryption iteration of data word IN2.
Fourth encryption iteration of data word IN1.
Fifth encryption iteration of data word IN3.
Sixth encryption iteration of data word IN2.
. . .

In the encryption-related example above, the control circuitry provides functional inputs from the I/O interfaces to the combinational logic circuits at the beginning of the encryption sequence (before the first encryption iteration) and extracts outputs from the combinational logic circuits to the I/O interfaces at the end of the encryption sequence (after the last encryption iteration). In the more general case, the control circuitry may provide one or more inputs at any suitable clock cycle, e.g., every clock cycle, and extract one or more outputs at any suitable clock cycle, e.g., every clock cycle. Put more broadly, (i) the current state of device 24 is preserved by the various FFs, (ii) the next state is a function of the current state, the combinational-logic operation and one or more inputs from the I/O interfaces, and (iii) outputs to the I/O interfaces are reflections of (e.g., a portion of) the current state, the combinational-logic operation, and one or more inputs from the I/O interfaces.

The other combinational logic circuits alternate between encryption sequences in a similar manner. The operation of combinational logic circuits 28A-28C of device 24 in the present example is summarized in Table I below:

TABLE I

| Clock cycle | Circuit 28A | Circuit 28B | Circuit 28C |
|---|---|---|---|
| CLK1 | $1^{st}$ iteration of encrypting IN1 | $1^{st}$ iteration of encrypting IN2 | $1^{st}$ iteration of encrypting IN3 |
| CLK2 | $2^{nd}$ iteration of encrypting IN3 | $2^{nd}$ iteration of encrypting IN1 | $2^{nd}$ iteration of encrypting IN2 |
| CLK3 | $3^{rd}$ iteration of encrypting IN2 | $3^{rd}$ iteration of encrypting IN3 | $3^{rd}$ iteration of encrypting IN1 |
| CLK4 | $4^{th}$ iteration of encrypting IN1 | $4^{th}$ iteration of encrypting IN2 | $4^{th}$ iteration of encrypting IN3 |
| CLK5 | $5^{th}$ iteration of encrypting IN3 | $5^{th}$ iteration of encrypting IN1 | $5^{th}$ iteration of encrypting IN2 |
| CLK6 | $6^{th}$ iteration of encrypting IN2 | $6^{th}$ iteration of encrypting IN3 | $6^{th}$ iteration of encrypting IN1 |
| ... | ... | ... | ... |

As seen in the table, the encryption of each data word is distributed among the multiple functionally-equivalent combinational logic circuits. From the perspective of a particular combinational logic circuit—In successive clock cycle the combinational logic circuit alternates between combinational-logic operations belonging to different encryption sequences.

The distributed, coupled, alternating operation of the combinational logic circuits introduces noise into the power consumption and radiation profile of device 24. In particular, as explained above, the alternating operation of the combinational logic circuits decouples the relation between (i) data transitions in a sequence of combinational-logic operations, and (ii) observed power consumption. Some additional noise may be due to the fact that the combinational logic circuits are functionally-equivalent, but not 100% identical. Differences between combinational logic circuits may comprise, for example, differences in timing, power consumption and/or radiation, even when processing the same inputs. As a result, resilience to side-channel attacks is increased considerably.

As explained above, intermediate outputs of a given sequence of combinational-logic operations (e.g., an encryption operation) propagate from one combinational logic circuit to another. The end result of a given sequence of combinational-logic operations (e.g., an encrypted data word) can be produced by any of the combinational logic circuits, depending on the number of combinational logic circuits and on the number of combinational-logic operations in the sequence.

On the other hand, it is typically required to associate the end result with the initial input data. For example, when an input data word is provided for encryption on a certain I/O interface ($I/O_1$, $I/O_2$ or $I/O_3$), it is typically required to return the encrypted data word on the same I/O interface.

For this purpose, in some embodiments device 24 comprises control circuitry that is configured to (i) route input data to the appropriate combinational logic circuits, (ii) extract output data from the appropriate combinational logic circuits, and (iii) associate the output data with the corresponding input data.

The control circuitry is typically aware of the alternation pattern among the combinational logic circuit, and is therefore able to extract the end result of a given sequence of combinational-logic operations from the correct combinational logic circuit at the correct clock cycle, and output this end result to the appropriate I/O interface.

With reference to the above example, the control circuitry is configured to receive an input data word on a certain I/O interface, extract the corresponding output data word (e.g., an encrypted version of the input data word) from the correct combinational logic circuit, and send the output data word to the same I/O interface on which the input data word was received.

In the embodiment of FIG. 1, the control circuitry comprises a bus 36, three multiplexers/demultiplexers 40A-40C (denoted simply MUX for brevity), and a state machine 44. MUXs 40A, 40B and 40C are coupled to I/O interfaces $I/O_1$, $I/O_2$ and $I/O_3$, respectively. Each MUX is able to route input data from the I/O interface, via bus 36, to any of the combinational logic circuits. In the opposite direction, each MUX is able to route input data from any of the combinational logic circuits, via bus 36, to the I/O interface. The switching of MUXs 40A, 40B and 40C is controlled by state machine 44. In one example, state machine 44 comprises a cyclic modulo-3 counter (in the general case a modulo-n counter, n being the number of combinational logic circuits).

It is noted that the description above refers to an encryption operation, purely by way of example. In alternative embodiments, the coupled architecture of combinational logic circuits in device 24 can be used for performing any other suitable operation that comprises a sequence of combinational-logic operations. Examples of such operations comprise secure computations such as decryption, signing and/or signature verification, general-purpose computations such as Arithmetic-Logic Unit (ALU), Digital Signal Processing (DSP) or Graphics Processing Unit (GPU) operations, digital filtering and data movement operations, to name only a few.

In the example of FIG. 1, each set of FFs 32 provides inputs to its corresponding combinational logic circuit 28, after sampling the outputs of a peer combinational logic circuit. Coupling can also be performed in the opposite direction. In other words, in an alternative embodiment, each set of FFs 32 may sample the outputs of its corresponding combinational logic circuit 28, and provide the sampled outputs as inputs to a peer combinational logic circuit. In fact, each set of FFs 32 can be viewed as being coupled between two combinational logic circuits 28, and equally associated with both of them.

Note also that most of the interconnections shown in FIG. 1, e.g., the interconnections leading to/from FFs 32 and the interconnections leading to/from combinational logic circuits 28, typically comprise multiple signal lines. In the figure these interconnections are drawn as single lines purely for clarity.

Combinational Logic Circuits Using Negative Combinational Logic

In some embodiments, at least one of the combinational logic circuits in the secure device, is implemented using negative logic. In the present context, the term "negative logic" means that, in comparison with another combinational logic circuit ("reference circuit"), the combinational logic interprets logical "1" as logical "0", and vice versa. In order for a negative-logic combinational logic circuit to be functionally-equivalent to the reference circuit, inverters (NOT gates) are placed on all the inputs and outputs of the former.

One simple example of the use of negative logic is an AND gate, which is functionally-equivalent to an OR gate having inverters on its inputs and output. Higher-complexity combinational-logic operations, such as the secure computations used in combinational logic circuits 28, can also be converted into functionally-equivalent negative-logic implementations. Implementing a secure device using a mix of negative-logic and regular-logic combinational logic circuit further increases the resilience of the device to side-channel attacks.

Figure 2:
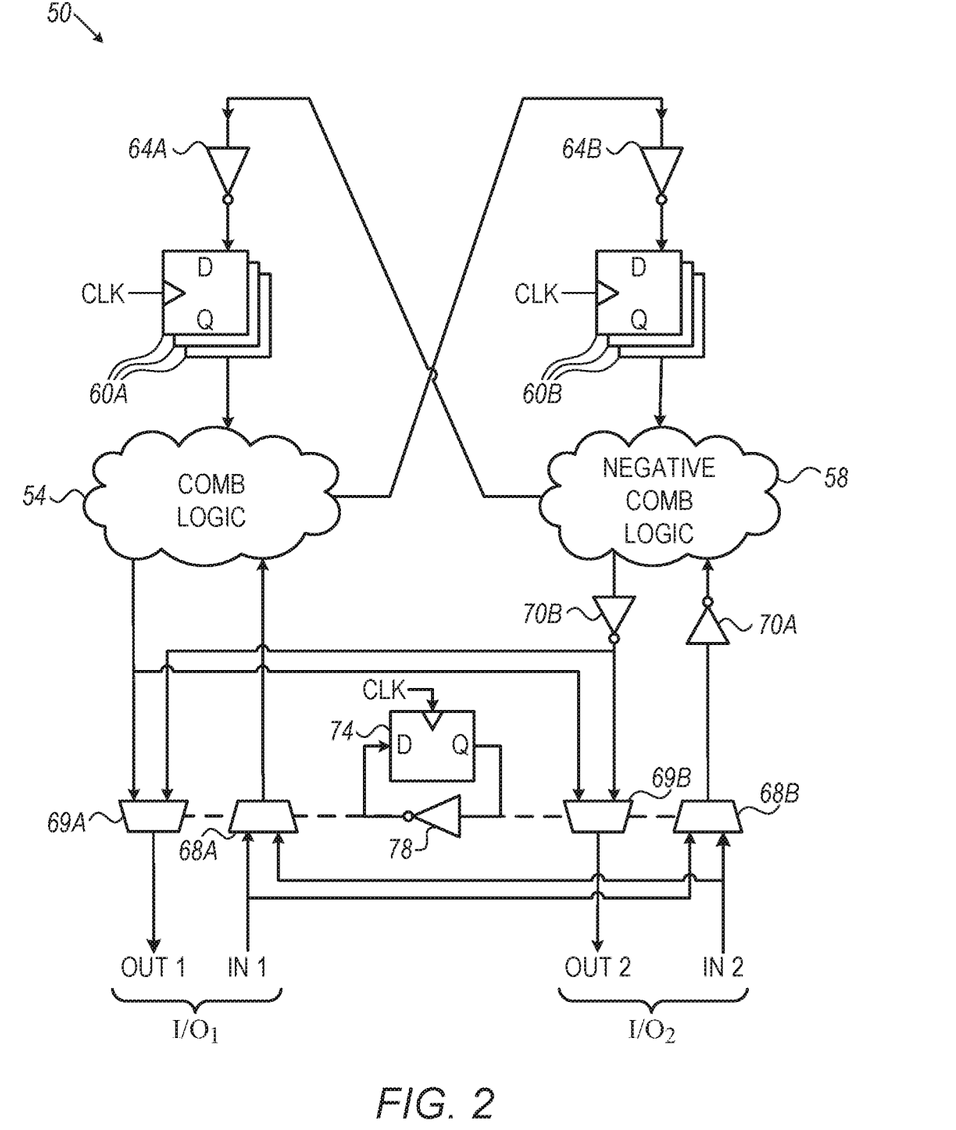
FIG. 2 is a block diagram that schematically illustrates a secure electronic device comprising a negative-logic combinational logic circuit, in accordance with an alternative embodiment of the present invention.

FIG. 2 is a block diagram that schematically illustrates a secure electronic device 50 using negative-logic combinational logic circuit, in accordance with an alternative embodiment of the present invention. In the present example, device 50 comprises two combinational logic circuits 54 and 58, which are functionally-equivalent to one another, even though combinational logic circuit 58 uses negative logic relative to combinational logic circuit 54.

The high-level architecture of device 50 is similar to that of device 24 of FIG. 1, for the case of two combinational logic circuits: A set of FFs 60A samples the outputs of combinational logic circuit 58, and these sampled outputs are provided as inputs to combinational logic circuit 54 for the next clock cycle. Similarly, a set of FFs 60B samples the outputs of combinational logic circuit 54, and these sampled outputs are provided as inputs to combinational logic circuit 58 for the next clock cycle.

A pair of input MUXs 68A and 68B connect the two combinational logic circuits to inputs IN1 and IN2 of two I/O interfaces denoted I/O$_1$ and I/O$_2$. A pair of output MUXs 69A and 69B connect the two combinational logic circuits to outputs OUT1 and OUT2 of the two I/O interfaces I/O$_1$ and I/O$_2$. In this example, the state machine that controls MUXs 68A, 68B, 69A and 69B comprises a modulo-2 counter implemented by a FF 74 and an inverter 78.

Unlike the configuration of FIG. 1, in the configuration of FIG. 2 combinational logic circuit 58 uses negative logic relative to combinational logic circuit 54. Therefore, combinational logic circuit 58 has inverters (denoted 64A, 64B, 70A and 70B) on all its inputs and outputs (including the inputs and outputs connecting to combinational logic circuit 54, and the inputs and outputs connecting to the I/O interfaces). In the present context, combinational logic circuits 54 and 58 are also regarded as functionally equivalent to one another, as they are viewed from the perspective of the I/O interfaces and state-sampling components (i.e., including the inverters).

Negative-logic implementation of a given combinational-logic operation can be implemented in various ways. Some implementations may use, for example, the Wave Dynamic Differential Logic (WDDL). WDDL implementations are described, for example, by Verbauwhede, in "Digital Circuits: Why They Leak, How to Counter," Design and Security of Cryptographic Functions, Algorithms and Devices, Albena, Bulgaria, July, 2013; and by Titi et al., in "Prototype IC with WDDL and Differential Routing—DPA Resistance Assessment," 7$^{th}$ International Workshop on Cryptographic Hardware and Embedded Systems, CHES, 2005.

The negative-logic implementation of FIG. 2 can be viewed as an extreme way of implementing combinational logic circuits differently, while retaining functional-equivalence between them. Additionally or alternatively, other differences may exist between functionally-equivalent combinational logic circuits. Some differences may be introduced deliberately by the designer. Other differences may be introduced, for example, by the design or synthesis tools, or by process variations in the manufacturing process. Any such differences in internal implementation helps to diversify the power-consumption and radiation emission profiles of the IC, and in this manner improve resilience to side-channel attacks.

As noted above with regard to FIG. 1, in FIG. 2, as well, many of the interconnections comprise multiple signal lines. Similarly, the various MUXs and inverters (with the exception of inverter 78) also typically comprise multiple components or multi-signal components. In the figure these elements are drawn as singular lines purely for clarity.

The configurations of the electronic devices shown in FIGS. 1 and 2 are example configurations that are depicted purely for the sake of conceptual clarity. In alternative embodiments, any other suitable configurations can be used.

For example, the disclosed techniques are not limited to the case of two or three combinational logic circuits, and can be used with any suitable number of combinational logic circuits. Any suitable number of combinational logic circuits (or none) may be implemented using negative logic. As yet another example, the disclosed techniques are not limited to FFs, and can be implemented using other types of state-sampling components, such as latches, Static Random Access Memory (SRAM) cells, or any other suitable type of memory cells. Each sampled output may be "logic high" or "logic low".

Additional aspects of mitigating side-channel attacks are addressed in U.S. patent application Ser. No. 16/194,342, filed Nov. 18, 2018, which is assigned to the assignee of the present patent application and whose disclosure is incorporated herein by reference.

In various embodiments, any of the disclosed devices may be implemented using any suitable hardware, such as using one or more discrete components, one or more Application-Specific Integrated Circuits (ASICs) and/or one or more Field-Programmable Gate Arrays (FPGAs).

ADDITIONAL EMBODIMENTS AND VARIATIONS

The description that follows lists several additional embodiments and variations. The description makes reference to secure device 24 of FIG. 1 and its components, by way of example only.

In the description of FIG. 1 above, all sets of input data (the input data provided on I/O$_1$, I/O$_2$ and I/O$_3$) was genuine data provided for secure processing. In alternative embodiments, the control circuitry initializes one or more of the sets of input data to be random or pseudorandom data, while one or more other sets of input data are initialized with genuine data for secure processing. For example, the input data provided on $I/O_1$ may comprise pseudorandom data, and the input data provided on $I/O_2$ and $I/O_3$ may comprise genuine data. In this scenario, the pseudorandom data propagates across the various combinational logic circuits 28, undergoes combinational-logic operations that further randomize it, and in this manner helps masking the genuine data that is being processed by combinational logic circuits 28.

The ability to process pseudorandom data in one or more of the combinational logic circuits provides a configurable trade-off between security level and throughput. To increase security at the expense of throughput, the control circuitry may set a higher portion of the input data to be pseudorandom, and vice versa. This setting may be user-defined.

In some embodiments, one or more of combinational logic circuits 28 continue operating, i.e., applying the combinational-logic operation, even after the output data has been extracted. Additionally or alternatively, one or more of combinational logic circuits 28 begin operating, i.e., applying the combinational-logic operation, before the input data has been provided.

In an example embodiment, combinational logic circuits 28 operate continuously regardless of whether input data has been provided to them or not, including after finalizing the sequence of iterations and while waiting for new input data to be ready. When an end result (set of output data) is ready, the control circuitry may write it to an output register or buffer that is separate from the combinational logic circuit.

In some embodiments, the control circuitry may insert random delays before reading output data from combinational logic circuits 28, and/or before providing new input data to combinational logic circuits 28.

In one example implementation, the control circuitry may provide input data to different combinational logic circuits 28 with some relative delay. For example, the control circuitry may perform the following process:

Provide $1^{st}$ input data to $1^{st}$ combinational logic circuit.
Wait several clock cycles.
Provide $2^{nd}$ input data to $2^{nd}$ combinational logic circuit.
Wait until $1^{st}$ output data is ready.
Optionally, wait a random number of clock cycles.
Provide $3^{rd}$ input data to $3^{rd}$ combinational logic circuit.
. . .

The example modes of operation described above, which deliberately deviate from the expected temporal behavior, helps to hide the actual activation and/or deactivation times of the secure computation, and to further mask characteristic patterns from being observable by a side-channel attack.

In some embodiments, a given combinational logic circuit 28 may check its own integrity, e.g., by running an inverse operation or known answer test. This sort of integrity checking is helpful, for example, for detecting fault-injection attacks.

In some embodiments, the disclosed techniques can be used for introducing coupling between two or more Central Processing Unit (CPU) cores. Consider an example involving two CPU cores denoted CPU1 and CPU2 that are coupled to one another. CPU1 executes certain target code, and CPU2 executes some predefined loop of operations that processes random data. CPU2 may perform integrity checks by comparing intermediate results of the loop, e.g., to identify fault injection. An example loop comprising integrity checking, which may be executed by CPU2, is as follows:

Get two random or pseudorandom numbers (NRAND)
Write one of the numbers to R0 (R# denotes CPU registers) and the other number to R1

R0+3*R1→R2
R1+5*R2→R3
R2+7*R3→R4
R3+11*R4→R5
. . . R[n−2]+prime*R[n−1]→Rn
Then, do the inverse calculation and compare to R0 and R1 values.
If R0, R1 does not match result—alert on suspected tampering.

Further alternatively, the disclosed techniques can be used for introducing coupling between various other types of combinational logic circuits, such as between two or more Digital Signal Processing (DSP) units or cryptographic accelerators, for example.

In some embodiments, the coupling between combinational logic circuits is fixed. In these embodiments, for a given FF 32, the identity of the combinational logic circuit whose output is being sampled does not change, and the identity of the combinational logic circuit that uses the sampled output as input does not change. In other embodiments, the control circuitry may modify the coupling scheme, e.g., on power-up or during operation, e.g., according to some prior definition or at random. For example, the control circuitry may switch the input of a given FF 32 from one circuit to another, and/or switch the output of a given FF 32 from one circuit to another. This configurability may be implemented by adding MUXs to the inputs and/or outputs of one or more of FFs 32.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A secure Integrated Circuit (IC), comprising:
multiple functionally-equivalent combinational logic circuits, each combinational logic circuit configured to receive one or more inputs, and to apply to the one or more inputs an iteration of an iterative secure computation, so as to produce one or more outputs;
multiple sets of state-sampling components, each set comprising one or more state-sampling components configured to sample one or more of the outputs of one of the functionally-equivalent combinational logic circuits and to provide one or more of the sampled outputs as inputs to another of the functionally-equivalent combinational logic circuits; and
control circuitry, configured to:
receive multiple separate sets of input data, each set of input data to be independently subjected to the iterative secure computation;
route each set of input data to a different one of the functionally-equivalent combinational logic circuits; and
for each set of input data:

(i) determine a respective one of the functionally-equivalent combinational logic circuits that applies a last iteration of the iterative secure computation, and thus produces a result of the iterative secure computation corresponding to that set of input data;
(ii) extract the result from the one of the functionally-equivalent combinational logic circuits that was determined to apply the last iteration; and
(iii) output the result of the iterative secure computation in association with the respective set of input data.

2. The secure IC according to claim 1, wherein, by providing the sampled outputs of one of the combinational logic circuits as inputs to another of the combinational logic circuits, the control circuitry is configured to control a given one of the combinational logic circuits to apply the iteration of the iterative secure computation to different ones of the sets of input data in successive clock cycles.

3. The secure IC according to claim 1, wherein at least two of the functionally-equivalent combinational logic circuits differ in hardware implementation from one another.

4. The secure IC according to claim 1, wherein at least one of the functionally-equivalent combinational logic circuits is implemented using negative logic relative to another of the functionally-equivalent combinational logic circuits.

5. The secure IC according to claim 1, wherein the control circuitry is configured to receive the sets of input data over respective I/O interfaces, and to output each result of the iterative secure computation on a same I/O interface via which the corresponding set of input data was received.

6. The secure IC according to claim 1, wherein the control circuitry is configured to distribute the sets of input data to the functionally-equivalent combinational logic circuits in cyclic alternation, and to collect the corresponding results of the iterative secure computation from the functionally-equivalent combinational logic circuits in cyclic alternation.

7. The secure IC according to claim 1, wherein the control circuitry is configured to initialize at least one of the sets of input data to be random or pseudorandom data.

8. The secure IC according to claim 1, wherein one or more of the combinational logic circuits are configured to perform at least one of: (i) continue applying the iteration of the iterative secure computation after the result has been extracted, and (ii) begin applying the iteration of the iterative secure computation before the input data has been provided.

9. The secure IC according to claim 1, wherein the control circuitry is configured to cause relative delays between times at which the input data is provided to at least two of the combinational logic circuits.

10. A method for data processing in a secure Integrated Circuit (IC), the method comprising:
operating multiple functionally-equivalent combinational logic circuits, including, in each combinational logic circuit, receiving one or more inputs and applying to the one or more inputs an iteration of an iterative secure computation, so as to produce one or more outputs;
operating multiple sets of state-sampling components, including, in each set, sampling one or more of the outputs of one of the functionally-equivalent combinational logic circuits by one or more state-sampling components and providing one or more of the sampled outputs as inputs to another of the functionally-equivalent combinational logic circuits; and
using control circuitry, receiving multiple separate sets of input data, each set of input data to be independently subjected to the iterative secure computation, routing each set of input data to a different one of the functionally-equivalent combinational logic circuits, and, for each set of input data:
(i) determining a respective one of the functionally-equivalent combinational logic circuits that applies a last iteration of the iterative secure computation, and thus produces a result of the iterative secure computation corresponding to that set of input data;
(ii) extracting the result from the one of the functionally-equivalent combinational logic circuits that was determined to apply the last iteration; and
(iii) outputting the result of the iterative secure computation in association with the respective set of input data.

11. The method according to claim 10, and comprising, in a given one of the combinational logic circuits, applying the iteration of the iterative secure computation to different ones of the sets of input data in successive clock cycles.

12. The method according to claim 10, wherein at least two of the functionally-equivalent combinational logic circuits differ in hardware implementation from one another.

13. The method according to claim 10, wherein applying the iteration of the iterative secure computation comprises, in at least one of the functionally-equivalent combinational logic circuits, applying the iteration of the iterative secure computation using negative logic relative to another of the functionally-equivalent combinational logic circuits.

14. The method according to claim 10, wherein receiving the input data comprises receiving the sets of input data over respective I/O interfaces, and wherein outputting the result comprises outputting each result of the iterative secure computation on a same I/O interface via which the corresponding set of input data was received.

15. The method according to claim 10, wherein routing the input data comprises distributing the sets of input data to the functionally-equivalent combinational logic circuits in cyclic alternation, and wherein extracting the data result comprises collecting the corresponding results of the iterative secure computation from the functionally-equivalent combinational logic circuits in cyclic alternation.

16. The method according to claim 10, and comprising initializing at least one of the sets of input data to be random or pseudorandom data.

17. The method according to claim 10, wherein applying the ee iteration of the iterative secure computation comprises, in one or more of the combinational logic circuits, performing at least one of: (i) continuing applying the iteration of the iterative secure computation after the result has been extracted, and (ii) beginning applying the iteration of the iterative secure computation before the input data has been provided.

18. The method according to claim 10, and comprising causing relative delays between times at which the input data is provided to at least two of the combinational logic circuits.

* * * * *